April 16, 1968   F. H. CARY   3,378,030

VALVE

Filed July 26, 1965

INVENTOR
FRANCIS H. CARY

BY  *Dodge and Sons*

ATTORNEYS

United States Patent Office 3,378,030
Patented Apr. 16, 1968

3,378,030
VALVE
Francis H. Cary, Hope, R.I., assignor to General Signal Corporation, a corporation of New Jersey
Filed July 26, 1965, Ser. No. 474,626
2 Claims. (Cl. 137—516.29)

This invention relates to check valves for controlling either gaseous or liquid flow, and particularly to check valves suitable for use in the inlet and discharge lines of chemical feed pumps of the diaphragm and plunger types.

The object of the invention is to provide an economical cartridge type check valve unit which can be installed in a flow line either by itself or with another unit merely by clamping the unit or units between the mating flanges of a pair of pipes, and which affords low resistance, is free from leakage, chatter and slamming, and is capable of operating in any attitude, at high pressures and at high cycling frequencies.

The preferred embodiment of the invention is described herein in detail with reference to the accompanying drawing in which.

Figure 1:
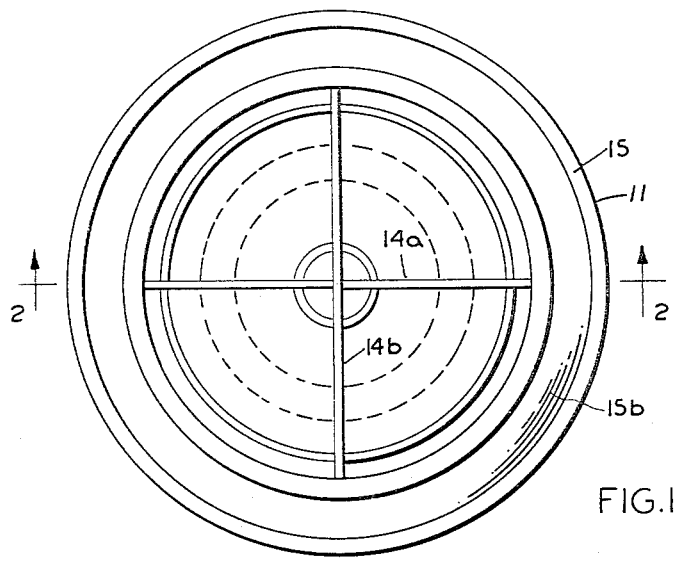
FIG. 1 is a plan view of the cartridge unit.
Figure 2:
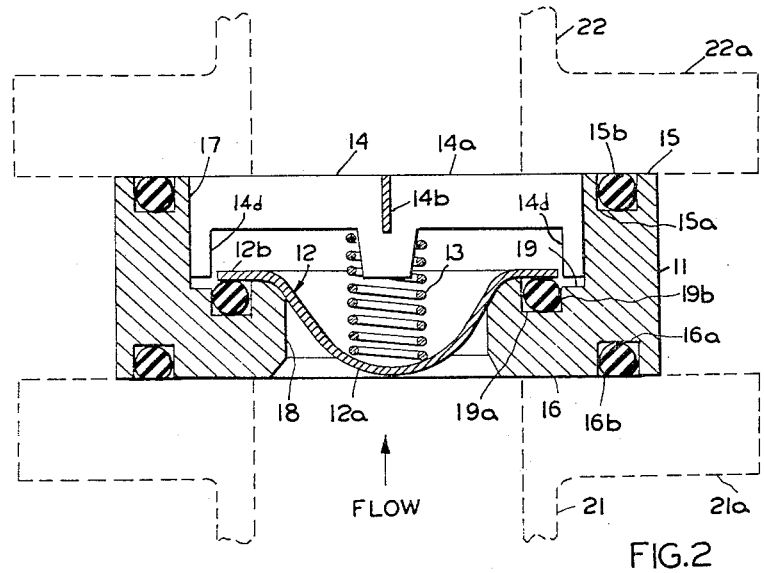
FIG. 2 is a sectional view taken on line 2—2 of FIG. 1.

As shown in the drawing, the preferred check valve comprises four main parts, namely, a body 11, a sheet metal poppet 12, a coil compression spring 13, and a spider 14 defined by two notched interfitting sheet metal arms 14a and 14b. These parts can be made of various materials depending upon the pressure and the nature of the fluid being handled. The body 11 is either machined or precision cast, and the poppet 12 and arms 14a and 14b are stampings. The body 11 is a short circular cylinder having plane, parallel end faces 15 and 16, and containing a stepped, circular, through bore whose large and small diameter portions 17 and 18, respectively, are separated by an annular shoulder 19. In a typical valve, the height of body 11 is about one-third its diameter. The end faces 15 and 16 and the shoulder 19 contain circular grooves 15a, 16a, and 19a, respectively, which are coaxial with the through bore and in which are seated elastic sealing rings 15b, 16b, and 19b, respectively, made of a suitable elastomer which is compatible with the fluid being handled. While the illustrated sealing rings have a circular cross section, it will be understood that other rings, such as those of square or rectangular cross section, may be used. In keeping with known sealing techniques, the depth of each of the grooves 15a, 16a and 19a is slightly less than the corresponding dimension of the sealing ring.

Figure 3:
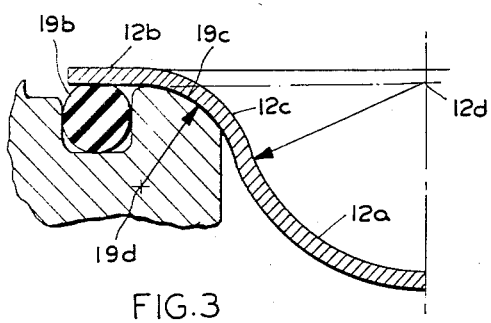
FIG. 3 is an enlarged view of a portion of FIG. 2 showing the design of the poppet seat.

The poppet 12 is circular and is formed with a central dimple 12a that extends into the small diameter bore portion 18, an annular flange 12b that lies in a radial plane and overlies groove 19a, and an intermediate curved connecting portion 12c which is shaped to fit the rounded inner edge 19c of shoulder 19. The dimple 12a is substantially a hemisphere whose center is at point 12d (see FIG. 3), and the center of curvature of the mating parts 12c and 19c is at point 19d. With this arrangement, that portion of the poppet subjected to the pressure differential between bore portions 17 and 18 when the valve is closed is almost entirely spherical in shape, and thus has nearly optimum strength characteristics. In view of this, and the fact that body 11 is cylindrical, it should be evident that the improved valve can handle high pressure fluids. Moreover, since the pressure-resisting portion of the poppet is of spherical shape, the mass of the poppet can be quite low. This is important for several reasons. First, since the flow resistance of the valve depends in part on the force exerted by spring 13, and this biasing force varies directly with the mass of the poppet, it follows that the use of a poppet having low mass permits a reduction in the flow resistance of the valve. Second, a lightweight poppet can move in accordance with changes in flow velocity, and, therefore, it does not require a reversal in flow direction in order to seat, Third, the use of a low mass poppet, in combination with the elastic seat and the light biasing spring, eliminates slamming and chatter, thereby making unnecesasry the use of hardened parts and reducing the noise level and the magnitude of shocks imposed on the piping and the pump. Finally, when the poppet is light in weight, the valve can be cycled at higher frequencies, and, therefore, the pump on which it is used can be operated at a higher stroking rate.

The elastic sealing ring 19b and the rounded edge 19c of shoulder 19 define a two-part seat for poppet 12; the parts being so designed that as the valve closes, the flange 12b engages ring 19b and then, after that ring is compressed, the curved portion 12c moves into contact with rounded edge 19c. The use of an elastic seat precludes leakage through the valve, and the provision of the metal seat prevents overcompression of the sealing ring. The arms 14a and 14b of spider member 14, which are pressed into bore portion 17, are provided with central projections 14c which serve as a support and seat for spring 13, and with peripheral projections 14d which cooperate with the outer periphery of flange 12b to guide the poppet in its opening and closing movements. Since the poppet is spring biased in the closing direction, the improved valve may be installed in any attitude.

Inasmuch as neither spider member 14 nor poppet 12 extends beyond the end faces 15 and 16 of body 11, the improved valve can be installed in a flow line merely by clamping it between the mating flanges 21a and 22a of a pair of pipes or conduits 21 and 22. These flanges, of course, are drawn together by bolts (not shown) which extend between them. Furthermore, in cases where safety or reliability requires the use of multiple check valves in series, several check valves can be stacked one upon the other and the group clamped in place between the pipe flanges. In these installations, a flat washer is inserted between adjoining check valve units in order to provide a good seating surface for the sealing rings 15b and 16b. The ease with which the valve can be installed in and removed from the flow line is an important feature because it permits cleaning, inspection or replacement of the valve unit without the necessity for complicated or time-consuming plumbing operations.

It will be observed that as the check valve opens, flange 12b moves away from sealing ring 19b and opens an annular flow path that interconnects bore portions 17 and and 18. The large area afforded by this path is the main factor contributing to the low flow resistance of the valve. Furthermore, the pattern of the flow past flange 12b is relatively stable, resembling that characteristic of an orifice plate, and consequently, poppet 12 is free of the random oscillations in a plane normal to the valve axis that are encountered in conventional ball type check valves. As a result, the poppet can reseat without spinning.

As stated previously, the drawing and description relate only to the preferred embodiment of the invention. Since changes can be made in the structure of this embodiment without departing from the inventive concept, the following claims should provide the sole measure of the scope of the invention.

What I claim is:
1. A check valve comprising
    (a) a cylindrical body having parallel end faces and containing a bore which opens through said faces, the bore being provided with a step intermediate its ends that defines an annular shoulder that divides the bore into large and small diameter portions, the inner edge of the shoulder being rounded;
(b) three annular grooves, one formed in each end face and the other formed in the shoulder, the grooves encircling the bore;
(c) an elastic sealing ring seated in each annular groove;
(d) a thin, sheet metal valve head having an annular flange portion provided with a flat surface that overliess the groove in the shoulder, a spherical portion that projects into the small diameter portion of the bore, and an intermediate connecting portion which is curved to fit the rounded edge of the shoulder;
(e) a spider member fixed in the large diameter portion of the bore and having circumferentially spaced means which cooperates with the outer periphery of the flange portion of the valve head to guide the head in its opening and closing movements; and
(f) a coil compression spring reacting between the spider member and the spherical portion of the valve head and urging the valve head toward the shoulder on the body.

2. A check valve comprising
(a) a circular cylindrical body having plane, parallel end faces, the diameter of the body being substantially greater than the length;
(b) a straight, circular bore formed in the body and opening through said end faces, the bore having a step that defines an annular shoulder that divides the bore into small and large diameter portions, the inner edge of the shoulder being rounded;
(c) three annular grooves, one formed in each end face and in the shoulder and each encircling the bore;
(d) an elastic sealing ring seated in each annular groove;
(e) a circular, thin, sheet metal valve head having a central substantially hemispherical portion that projects into the small diameter portion of the bore, an annular flange portion provided with a flat surface that overlies the groove in the shoulder, and an intermediate connecting portion which is curved to fit the rounded edge of the shoulder;
(f) a spider member defined by crossed interfitting sheet metal arms which are pressed into the large diameter portion of the bore, the arms carrying longitudinal projections which cooperate with the outer periphery of the flange portion of the valve head to guide the head in its opening and closing movements; and
(g) a coil compression spring reacting between the spider member and the spherical portion of the valve head and urging the valve head toward the shoulder on the body;
(h) the longitudinal extent of the spider member and the valve head being such that neither part projects beyond the adjacent end face of the body.

References Cited

UNITED STATES PATENTS

| | | | |
|---|---|---|---|
| 1,226,870 | 5/1917 | Duryea | 137—543.19 X |
| 2,786,485 | 3/1957 | Steirly | 251—333 X |
| 3,009,476 | 11/1961 | Usab | 251—332 X |
| 3,051,196 | 8/1962 | Miller | 251—333 X |
| 3,244,195 | 4/1966 | Wanner | 137—543.1 |

FOREIGN PATENTS 1,086,204  8/1954  France.

ALAN COHAN, *Primary Examiner.*

D. LAMBERT, *Assistant Examiner.*

UNITED STATES PATENT OFFICE
CERTIFICATE OF CORRECTION

Patent No. 3,378,030                                        April 16, 1968

Francis H. Cary

It is hereby certified that error appears in the above numbered patent requiring correction and that the said Letters Patent should read as corrected below.

In the heading to the printed specification, line 4, for "a corporation of New Jersey" read -- a corporation of New York --; column 3, lines 9 and 10, for "overliess" read -- overlies --; column 4, line 17, for "body;" read -- body, --.

Signed and sealed this 3rd day of June 1969.

(SEAL)
Attest:

Edward M. Fletcher, Jr.

Attesting Officer

Commissioner of Patents